United States Patent [19]
Appleton

[11] Patent Number: 6,123,132
[45] Date of Patent: Sep. 26, 2000

[54] TIRE WITH SHOULDERS HAVING A PLY SUPPORT STRIP BETWEEN CARCASS AND INNER LINER

[75] Inventor: Pater Raymond Appleton, Sutton Coldfield, United Kingdom

[73] Assignee: Sumitomo Rubber Industries Limited, Hyogo-ken, Japan

[21] Appl. No.: 09/233,465

[22] Filed: Jan. 20, 1999

[30] Foreign Application Priority Data

Jan. 21, 1998 [GB] United Kingdom ............... 9801224

[51] Int. Cl.$^7$ .............. B60C 9/00; B60C 9/02; B60C 5/14
[52] U.S. Cl. .......... 152/458; 152/510; 152/549; 152/555
[58] Field of Search .................. 152/458, 555, 152/549, 548, 510

[56] References Cited

U.S. PATENT DOCUMENTS

| | | | |
|---|---|---|---|
| 924,186 | 6/1909 | Palmer | 152/549 |
| 3,506,513 | 4/1970 | Kline, Jr. | 152/548 X |
| 4,120,339 | 10/1978 | Shichman | 152/555 X |
| 4,871,004 | 10/1989 | Brown et al. | 152/548 X |

FOREIGN PATENT DOCUMENTS 2 096 949  10/1982  United Kingdom ............... 152/510

*Primary Examiner*—Adrienne C. Johnstone
*Attorney, Agent, or Firm*—Birch, Stewart, Kolasch and Birch, LLP

[57] ABSTRACT

A pneumatic tubeless tire comprising a carcass ply of reinforcing cords extending between two tire bead regions through sidewall regions and a tread region and an innerliner disposed radially inwardly of the carcass ply is herein described. Between the sidewall region and the tread region is a tire shoulder region. In each of these shoulder regions, there is a circumferentially extending ply support strip disposed radially between the carcass ply and the innerliner. The ply support strip comprises a rubber compound containing short discontinuous fibrillated aramid fibers in an amount of between 7 and 15 parts by weight per 100 parts by weight of rubber.

9 Claims, 2 Drawing Sheets

TIRE WITH SHOULDERS HAVING A PLY SUPPORT STRIP BETWEEN CARCASS AND INNER LINER

BACKGROUND

The present invention relates to pneumatic tires and particularly tubeless pneumatic tires comprising a carcass of cord reinforced rubber fabric. The invention is particularly but not exclusively applicable to radial tires in which the carcass cords extend radially between two bead regions.

Conventional pneumatic tires have a carcass comprising one or more plies of tire fabric consisting of a plurality of parallel reinforcing cords embedded into a thin film or sheet of rubber.

In modern radial tires the carcass comprises one or more plies having cords in a radial configuration, whereas in older cross-ply constructions two or more plies of tire fabric have their cords disposed at an angle to the radial direction and in crossing relationship to the cords of adjacent plies.

Materials suitable for cords of tires are varied and include organic materials such as rayon, nylon, polyester or aramid, inorganic materials such as glass or metals such as steel. Whichever material is used for the cord the tire manufacturer endeavors to maximize the structural integrity of the tire throughout its life by embedding the cords in suitable rubber compound known as a topping rubber which is particularly formulated to give good adhesion to material of the cord.

The carcass of a tubeless pneumatic tire is characterized by a rubber innerliner which is provided on the inside of the tire surface radially inwardly of the carcass ply for the purpose of retaining the inflation medium when the tire is mounted on a wheelrim. Accordingly the innerliner conventionally comprises a compound of a rubber which has low permeability to air, such as butyl rubbers or halo-butyl rubbers including bromo-butyl and chlorobutyl rubbers. The formulation of innerliner rubbers is directed towards maximizing impermeability to air and the resultant compounds have little or no adhesion to the materials of tire cords.

The manufacture of a tire commonly comprises a three-stage process. In the first stage the uncured rubber components of the carcass are laid sequentially around the outer surface of a drum to form a right-cylindrical assembly. This assembly includes a fabric of reinforcing cords which are laid over a thin sheet of rubber liner and anchored in each of the two edge regions of the cylinder which will ultimately form the bead regions of the tires. In radial tire manufacture the carcass ply cords extend perpendicularly between the edges of the right-cylindrical assembly.

In the second stage of manufacture the first stage right-cylindrical assembly is deformed into a toroidal shape by radially outwardly expanding the central portion of the cylinder whilst simultaneously moving the edge portions nearer to each other. The remaining components of the tread region are then assembled onto the crown of the toroid to complete assembly of the uncured tire.

In the final stage of manufacture the uncured tire is placed within a heated profile mould and given further slight radial expansion to form the tread pattern and finally vulcanize the tire assembly transforming it from a plastic to an elastomeric state.

A common problem which can arise in tire manufacture concerns the length of the cord path between the edges of the right-cylindrical carcass assembly in the first stage of manufacture. If this length is too short, or if the cord path length or cord extensibility varies significantly around the periphery of the cylinder then during the above-mentioned subsequent expansion of the carcass the cords may tighten excessively such that the rubber material radially inward of the cords is pushed outward through the spaces between adjacent cords. Thus effectively the carcass cords are "pulled through" their cord topping rubber into the rubber below. In a radial tire carcass this cord "pull through" is apt to occur locally in the tire shoulder region beneath and outward of the breaker edge where the carcass curvature increases most rapidly.

In extreme cases the carcass cords may pull all the way through to the interior surface of the tire at which occurrence the tire is scrapped on routine visual examination. However potentially more serious are cases where the carcass cords pull through to a lesser extent only into the rubber liner. Such occurrences may well not be evident on visual inspection of the tire but the lack of adhesion between the carcass cords and the rubber poses a severe risk of subsequent premature failure of the tire carcass in service.

BRIEF SUMMARY OF THE INVENTION

It is an object of the present invention to prevent the phenomenon of carcass cord "pull through".

According to the present invention a pneumatic tubeless tire comprises a carcass ply of reinforcing cords extending between two tire bead regions through sidewall regions and a tread region and an innerliner disposed radially inwardly of the carcass ply, characterized in that in each tire shoulder region which is between the sidewall region and the tread region there is a circumferentially extending ply support strip disposed radially between the carcass ply and the innerliner, the ply support strip comprising a rubber compound containing short discontinuous fibrillated aramid fibers in an amount of between 7 and 15 parts by weight per 100 parts by weight of rubber.

BRIEF DESCRIPTION OF THE DRAWINGS

Further aspects of the present invention will become apparent from the following description by way of example only of one embodiment in conjunction with the following schematic diagrams in which.

DETAILED DESCRIPTION OF THE INVENTION

Figure 1:
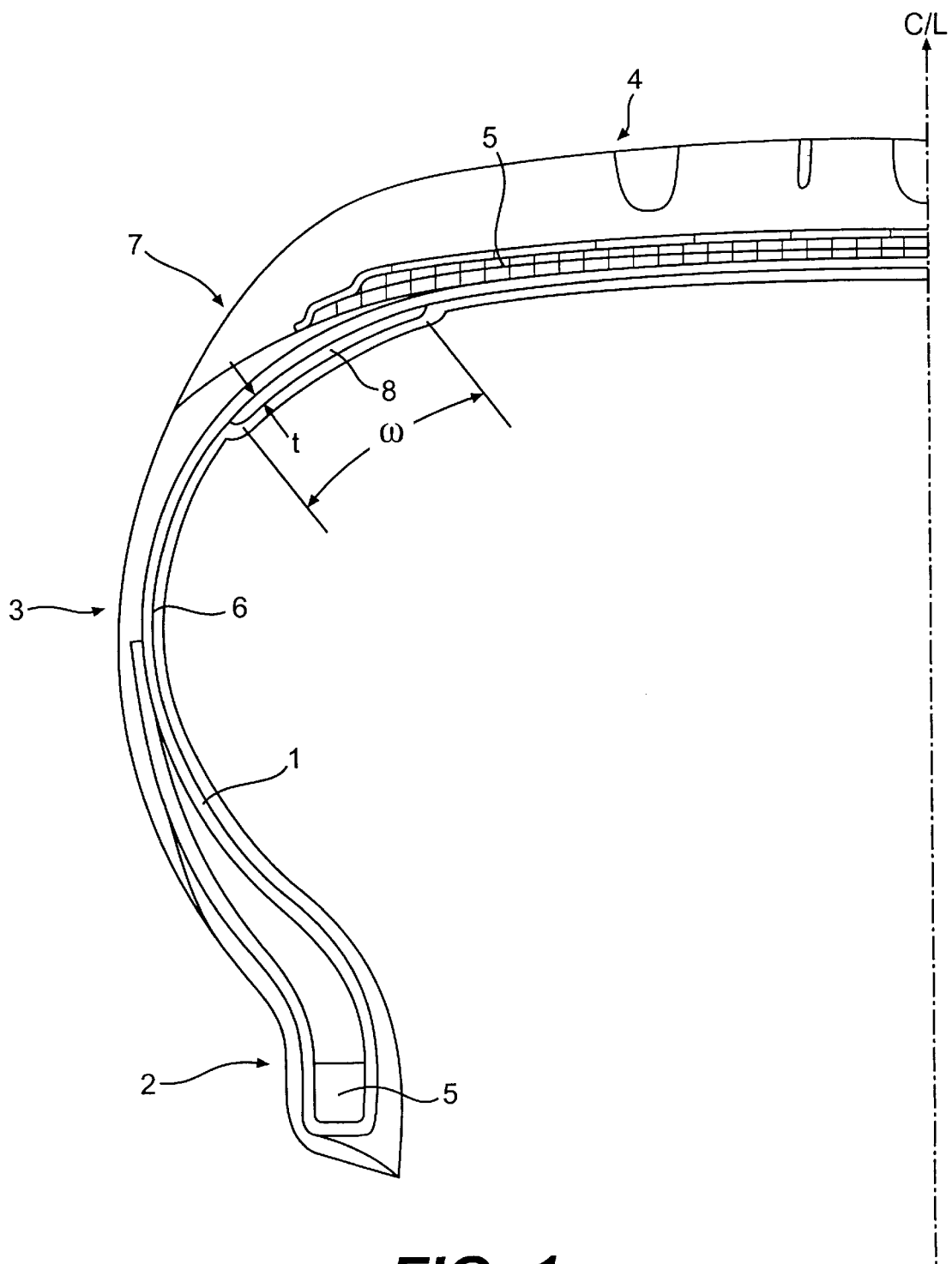
FIG. 1 shows a cross-section of one half of a tire of the invention.

The tire depicted in FIG. 1 is a tubeless radial tire having a carcass ply 1 of cords extending radially between bead regions 2 through sidewall regions 3 and across a tread region 4.

In each bead region the carcass ply of cords is anchored by being turned axially outwardly around a circumferentially extending inextensible bead core 5.

The tread region 4 is reinforced across its width by a circumferentially extending breaker 5 disposed radially outwardly adjacent to the carcass ply 1.

On the inner side of the carcass ply there is a rubber innerliner 6 comprising a compound of a low permeability halo-butyl rubber.

In the shoulder region 7 of the tire disposed between the carcass ply 1 the innerliner 6 is a ply support strip 8. This ply support strip 8 has a radial thickness t within the range of 0.5 to 1.5 mm and in this embodiment is 0.8 mm, and a width w measured along the carcass ply of between 15 and 75 mm, again in this embodiment 35 mm.

The ply support strip 8 comprises a compound of by weight 100 parts natural rubber, 40 parts carbon black and 10 parts of discontinuous discrete fibrillated aramid fibers. To facilitate preparation of the compound the aramid fibers are used in a commercially available form of a predispersion of 23% by weight of fibers in natural rubber which is marketed by EI Du Pont de Nemours as one of the "KEVLAR® M/B" elastomer masterbatch range of materials.

Whilst the fibrillated aramid fibers may be orientated randomly within the ply support strip 8 it is very much preferred to align them longitudinally in a direction substantially perpendicular to the longitudinal direction of the carcass reinforcing cords. Thus in the present embodiment the fibrillated aramid fibers are aligned within the ply support strip 8 in the tire circumferential direction.

Figure 2:
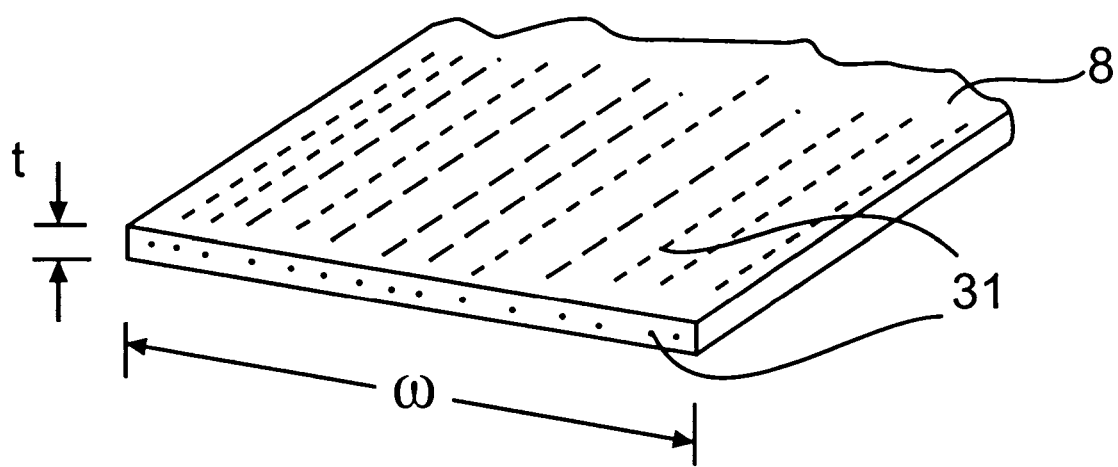
FIG. 2 shows the alignment of short discontinuous fibers in a ply support strip.

The ply support strip 8 may be prepared by either lengthwise calendering or extrusion both of which subject the material to shear conditions which tend to orientate the aramid fibers 31 in the preferred longitudinal alignment as shown schematically in FIG. 2.

Whilst the ply support strip of the present embodiment comprises 10 parts by weight of fibrillated aramid fibers the amount may vary from 7 to 15 parts per hundred parts by weight of rubber. It has been found that if the amount of fibrillated fibers is less than 7 parts then the ply support strip has insufficient reinforcement to properly prevent cord pull through whilst amounts in excess of 15 parts render the strip excessively stiff.

What is claimed is:

1. A pneumatic tubeless tire comprising a carcass ply of reinforcing cords extending between two tire bead regions through sidewall regions and a tread region and an innerliner disposed radially inwardly of the carcass ply, wherein in each tire shoulder region which is between the sidewall region and the tread region there is a circumferentially extending ply support strip disposed radially between the carcass ply and the innerliner, the ply support strip comprising a rubber compound containing short discontinuous fibrillated aramid fibers in an amount of between 7 and 15 parts by weight per 100 parts by weight of rubber.

2. A pneumatic tubeless tire according to claim 1, wherein the short fibers are aligned longitudinally substantially perpendicularly to the direction of radial thickness of the ply support strip.

3. A pneumatic tubeless tire according of claim 1, wherein the short discontinuous fibrillated aramid fibers of the ply support strip are aligned longitudinally in substantially the same direction.

4. A pneumatic tubeless tire according to claim 3, wherein the short fibers are aligned perpendicularly to the reinforcing cords of the adjacent carcass ply.

5. A pneumatic tubeless tire according to claim 1, wherein the reinforcing cords of the carcass ply extend substantially radially.

6. A pneumatic tubeless tire according to claim 5, wherein the short fibers are longitudinally aligned in the tire circumferential direction.

7. A pneumatic tubeless tire according to claim 1, wherein the ply support strip contains the short discontinuous fibrillated aramid fibers in an amount of 10 parts by weight per 100 parts of rubber.

8. A pneumatic tubeless tire according to claim 1, wherein the ply support strip has a thickness in the radial direction in the range of 0.5 mm to 1.5 mm.

9. A pneumatic tubeless tire according to claim 1, wherein the ply support strip has a width measured perpendicularly to the circumferential direction of the tire in the range of 15 mm to 75 mm.

\* \* \* \* \*